No. 896,984. PATENTED AUG. 25, 1908.
H. C. FREEMAN.
CONDUIT FOR ELECTRIC WIRES.
APPLICATION FILED JULY 13, 1907.
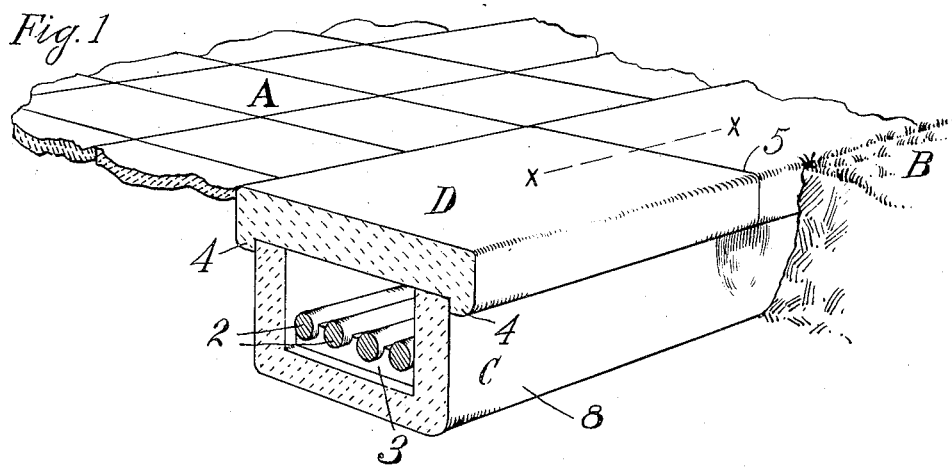
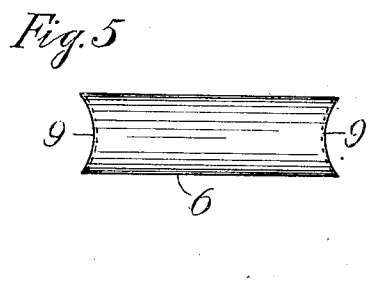
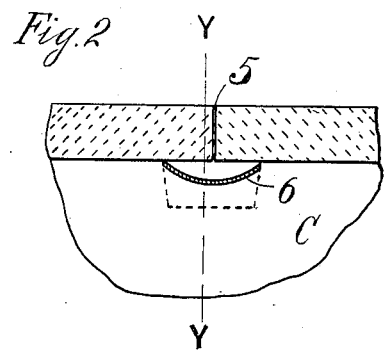
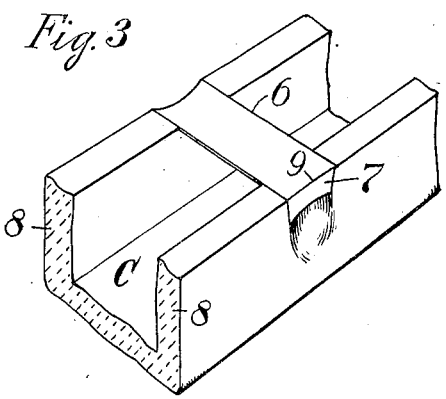
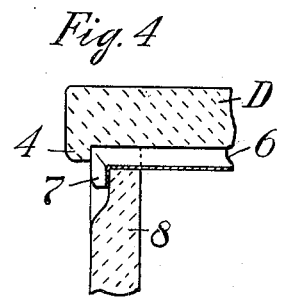
Witnesses,
George Voelker
Inventor,
Horace C. Freeman
by Lothrop & Johnson
his Attorneys.

UNITED STATES PATENT OFFICE.

HORACE C. FREEMAN, OF ST. PAUL, MINNESOTA.

CONDUIT FOR ELECTRIC WIRES.

No. 896,984.  Specification of Letters Patent.  Patented Aug. 25, 1908.

Application filed July 13, 1907. Serial No. 383,574.

*To all whom it may concern:*

Be it known that I, HORACE C. FREEMAN, a citizen of the United States, residing at St. Paul, in the county of Ramsey and State of Minnesota, have invented certain new and useful Improvements in Conduits for Electric Wires, of which the following is a specification.

My invention relates to improvements in conduits for electric wires, its object being to provide improved means for protecting the interior of the conduit from water entering through the joints of the cover.

The improvement is particularly adapted for concrete conduits having exposed covers and makes possible the use of uncemented butt joint cover sections, such sections being easy to make and easy to remove when it is desired to gain access to the conduit for laying, removing or repairing the wires.

More particularly the invention consists in the construction, combination and arrangement of parts hereinafter described and claimed.

In the accompanying drawings forming part of this specification, Figure 1 is a perspective view of a section of the conduit shown in place along the edge of a paved sidewalk; Fig. 2 is a longitudinal section on line *x—x* of Fig. 1, showing the conduit partly broken away; Fig. 3 is a perspective view of a broken away portion of the conduit trough showing one of the draining gutters; Fig. 4 is a vertical section on line *y—y* of Fig. 2 and Fig. 5 is a plan view of the gutter alone.

In the drawings is shown a concrete conduit arranged between the outer edge of a paved sidewalk A and a grassed boulevard B such as is often laid out between the sidewalk and the driveway. The conduit comprises a trough C in which may be laid cables 2, the cables resting in notched insulating racks 3, by which they are kept separated from one another and from the bottom and the walls of the trough. The trough is preferably molded in place in one continuous length so that it shall have no joints.

The cover-sections D are made with downwardly extending side flanges 4 to fit over the sides of the trough, and with square ends so as to form butt joints 5 with each other when placed end to end, as shown in Fig. 2. The top of the cover, being preferably flat and flush with the paved walk, will form in effect part of the walk.

To catch the water leaking down through the joints between the cover sections, and to discharge the same from the conduit, a transversely dished gutter 6, preferably of sheet metal stamping, is bridged across the top of the trough directly beneath each joint. The gutter is made with downturned dished ends or ears 7 to fit over the side walls 8 of the trough, which are dished at the top and sides to conform to the shape of the gutter and ears. In practice it will be found most convenient to place the gutters in the mold and to cast the troughs about them. Thus the gutter and ears will be sunk into the sidewalls of the trough so that the cover sections will rest squarely upon the top of the sidewalls, and the flanges 4 will fit closely against the sides thereof. It will be noticed that the gutter is dished along the end-edges or bends 9 which form the points of union with the ears 7, so as to form a continuous channel entirely across, over and down the sidewalls. The ears are made, preferably, with downwardly converging side edges so that they may be easily lifted from the trough.

In use, the water entering through the joints of the cover will be received in the gutters beneath. As the water collects it will flow along the gutter and be discharged on the outside of the trough at the side. It cannot flow in any other direction for the side edges of the gutter will abut against the under side of the cover and prevent overflow into the conduit.

I claim as my invention:

1. In a conduit for electric wires, in combination, a trough, a plurality of removable cover sections therefor, and a gutter bridged across the top of the trough beneath the joint between the sections and formed with a channel leading from side to side across the trough and between the cover and side walls thereof.

2. In a conduit for electric wires, in combination, a trough, a plurality of removable cover sections therefor, and a gutter bridged across the top of the trough and formed with a channel leading from side to side across the trough, the trough being formed with a depression in its side walls registering with the channel of the gutter and forming a continuation thereof.

3. In a conduit for electric wires, in combination, a trough, a cover therefor, and a gutter bridged across the trough and discharging on the outside of the side-walls thereof, the gutter being sunk into the side-walls so as to permit the cover to fit closely against said walls.

4. In a conduit for electric wires, in combination, a trough, a cover therefor having flanges fitting over the side-walls of the trough, and a dished gutter bridged across the top of the trough and having dished terminal ears fitting over the side-walls thereof, said gutter and its ears being sunk into said side-walls so as to permit the cover and its flanges to fit closely against the side walls without obstructing the gutter channel.

In testimony whereof I affix my signature in presence of two witnesses.

HORACE C. FREEMAN.

Witnesses:
 ARTHUR P. LOTHROP,
 HATTIE SMITH.